Fig. 1

INVENTOR.
JOHN W. ELDRED.

INVENTOR.
JOHN W. ELDRED.
BY
Charles M. Hogan
ATTY.

INVENTOR.
JOHN W. ELDRED.
BY
Charles M. Hogan,
ATTY.

INVENTOR.
JOHN W. ELDRED.
BY
Charles M. Hogan,
ATTY

Patented Feb. 24, 1953

2,629,205

UNITED STATES PATENT OFFICE 2,629,205

BURNER AND BURNER CONTROL SYSTEM FOR GLASS BURN-OFF MACHINES

John W. Eldred, Columbus, Ohio

Application December 24, 1948, Serial No. 67,235

3 Claims. (Cl. 49—50)

This invention relates generally to automatic machines for manufacturing articles of glassware and specifically to a novel burner and burner-control system. Although the invention is of particular utility as incorporated in or employed in the well-known commercially accepted Eldred thirty spindle tumbler burn-off machine, described and claimed in U. S. Patent No. 2,537,660 issued January 9, 1951, entitled "Apparatus for Thermally Severing Moil from Hollow Articles of Glassware," and is herein described as embodied in this burn-off machine, the invention may also be successfully practiced in connection with other burn-off machines. Reference is made to said co-pending application for a detailed description of the machine as a whole, the following specific description being generally confined to the novel burner, the burner-control system, and the parts of the burn-off machine immediately associated with the burners.

In the manufacture of drinking tumblers or the like, the open end of each specimen of formed ware, as it passes from the molding or forming machine, carries a superfluous integral extension of circular section, known to the art as the moil. The basic function of the burn-off machine is the rapid severance of the moil from the tumbler proper, this operation being rapidly performed on a large number of tumblers as they progress from the forming machine (i. e., from a conveyor-loader system taking the output of the forming machine) to a tempering leer (i. e., to an unloader-conveyor system feeding the output of the burn-off machine to the leer). The burner and burner-control system provided in accordance with this invention are not confined to this environment or to moil-severance for tumblers alone, but are described in such environment and application for purposes of illustration.

A primary object of my invention is to provide a flexible burner for producing a smooth small bead on the lip or rim of the tumbler or similar article from which the moil is severed.

Another object of the invention is to provide a dual burner for achieving quick severance of a narrow section of softened glass.

In accordance with the invention there is provided, in a rotary burn-off machine of the type including a plurality of ware-holding spindles each of which is so arranged as to transport glass ware through successive melting and severing segments while axially rotating the ware in registry with an individual one of the plurality of burner means, the improvement which resides in a plurality of burner means each comprising a pair of annular separately controlled but superimposed burners, one of which is adapted to generate a melting flame for heating a section of the ware and the other of which is adapted to generate a more intense severing flame for separating the moil from the ware at said sections, said burners having distinct radially inwardly directed sets of flame orifices, said sets being located in close proximity to each other.

The invention provides a mechanism whereby the size and finish of the heretofore commercially accepted but excessively large bead may be more effectively controlled and reduced. For a better understanding of the present invention, together with other and further objects, advantages and capabilities thereof, reference is made to the following detailed description of the accompanying drawings, in which there is shown an illustrative preferred form of burner and control system in accordance with the invention, as embodied in an Eldred burn-off machine.

Figure 1:
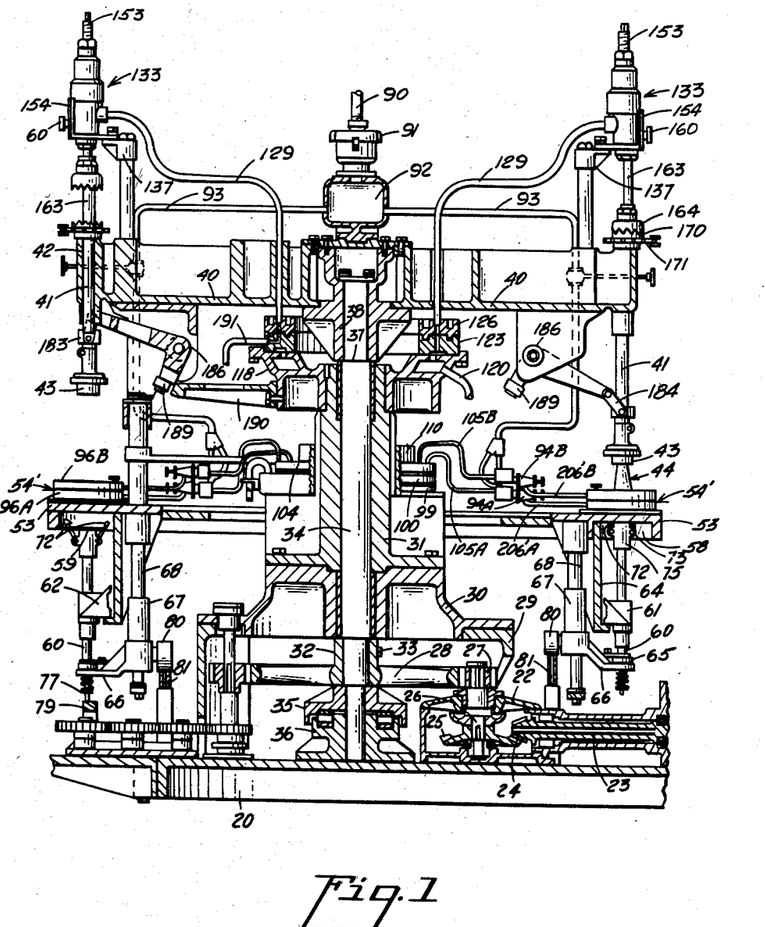
Fig. 1 is a vertical fragmentary sectional view taken through a burn-off machine as shown in the above-mentioned co-pending application, showing a suitable environment for the burner and control system provided in accordance with the present invention.

Referring now to Fig. 1 of the drawings, there are shown the parts of the above-mentioned burn-off machine with which the burners provided in accordance with the present invention are intimately associated. For purposes of facilitating cross-reference to my said co-pending patent application, common reference numerals are employed and reference numerals not common to both applications are primed wherever practicable. Attention is first directed to a rotatably-mounted table or turret 40 and to a ring-member 53 which rotates in unison with the table 40. The machine is mounted on a base 20. Carried by the base is a gear-case 22, in which is rotatably journaled a suitably powered drive shaft 23, carrying a pinion 24. This pinion drives a gear 25, fixed on one end of a vertically journaled shaft 26. A pinion 27 on the other end of this shaft drives a bull-gear 28, mounting in housing 29. The hub 32 of gear 28 is keyed as by 33 to upstanding main operating shaft 34. Flanged collar 35, secured to shaft 34, is rotatably mounted on bearing 36. Housing 29 is capped by a member 30, having an integral downwardly directed vertical bearing portion for shaft 34. Positioned on top of and secured to cover 30 is a bearing 31. The shaft 34 is reduced at 37 and rigidly secured to the hub 38 of the turret 40. The table 40 is rotated through the motion train: Prime mover (not shown) 23, 24, 25, 26, 27, 28, 32, 34, 38, 40. The purpose of this rotation is to carry the ware through the operating zones or segments indicated in Fig. 2, hereinafter more fully described.

Attention is next directed to the means for holding and handling the individual pieces of ware, i. e., the chucks 43 (Fig. 1) and associated elements. At spaced intervals around the table 40 are rotatably mounted spindles 41. Each spindle carries a depending chuck 43, which is adapted to receive and retain (as by suction) the closed end of a tumbler 44. The details of the pneumatic apparatus provided for that purpose are not necessary for the description of the present invention and are shown in my above-mentioned copending application. Disposed below and in axial registry with each chuck 43 is an associated moil support 59.

Figure 2:
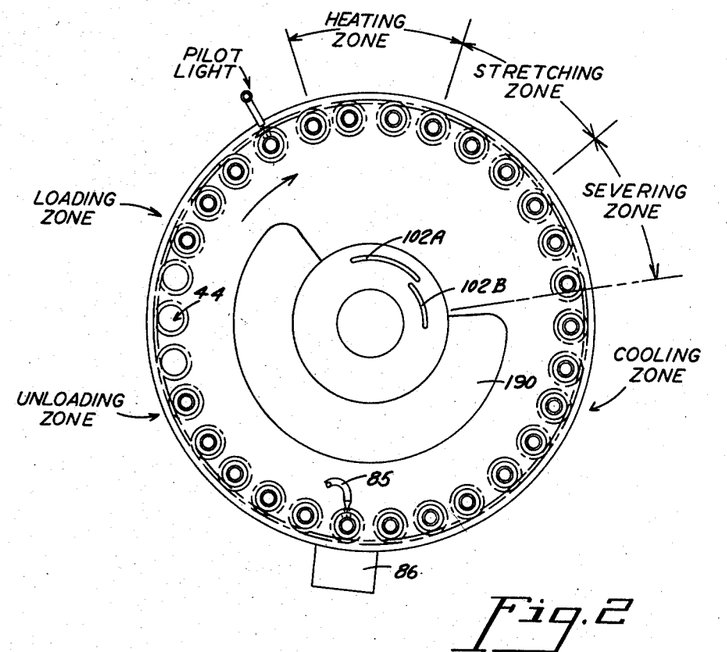
Fig. 2 is a diagrammatic plan of the Fig. 1 machine, taken above cam 190 (Fig. 1), primarily provided for purposes of illustrating the description of the operational zones through which each tumbler passes.

Referring now specifically to Fig. 2 of the drawings, it will be seen that the rotation of the carriage 40 and all ware supported by it is in a clockwise direction, as seen by an observer at the top of the machine. Each piece of formed ware, including moil, is deposited bottom-up on an individual support 59 (Fig. 1) at the place indicated by the arrow designated "Loading Zone" (Fig. 2). The deposit or delivery function may be performed by a transfer mechanism such as that disclosed in my U. S. Patent No. 2,415,997, issued February 18, 1947. Prior to the instant when each individual support 59 accepts a tumbler, the moil support is in its fully elevated position, the corresponding rod 69 (Fig. 3) is fully elevated to open the grippers 72, 72 and the corresponding chuck 43 is in elevated position, whereby there is sufficient clearance between the chuck and its associated burner 54' and support 59 to permit insertion of the tumbler between them (Fig. 1). The chuck is placed in this position as it leaves the unloading zone. However, after the table 40 rotates beyond the loading zone, the spindle is lowered to grasp the closed end of its tumbler and to impart axial rotation to the tumbler. Rod 69 (Fig. 3) is lowered to cause the fingers 72, 72 to grasp the moil before arrival at the stretching zone.

As the table continues to rotate each tumbler successively passes through a heating zone segment (Fig. 2), a stretching zone segment, a severing zone segment and a cooling zone segment, finally being discharged from the table at a point indicated by the arrow marked "Unloading Zone"; as by apparattus shown in my said co-pending patent application. As the ware leaves the severing zone, the associated chuck 43 is elevated, the action being initiated by a cam 190 (Figs. 1, 2). The burner provided in accordance with my invention is supplied with oxygen and fuel to produce a flame in one temperature range for melting and softening the tumbler section, as the tumbler passes through the heating and stretching zones. This burner is supplied with oxygen and fuel to produce a sharper flame in a higher temperature range for final severing of moil and tumbler as the tumbler passes through the severing zone. The grooves 102A and 102B (Figs. 2 and 5) successively control these two actions of the burner by governing its supply of oxygen. As the ware approaches the take-out point or unloading zone, the severed moil is blown into a chute 86 (Fig. 2) as by an air-blast device 85. As the table 40 continues to rotate the ware finally registers with the unloading zone, the vacuum grip of the chuck 43 on the bottom 46 is relaxed and the ware is removed from the table.

Next is described the means for stretching the moil. It will be understood that each tumbler 44 as received by my machine comprises a hollow body 45 (Fig. 6) having a closed base end 46 and a corrugated open-ended moil 47.

Each of the chucks 43 is associated with a burner 54' (Fig. 3) supported on the ring member 53. Each burner is placed above and axially aligned with an opening 58 formed in the ring member. Positioned concentrically in each opening 58 is an article support 59, mounted on the upper end of a vertical tube 60, secured in a sleeve 61, carried by a bracket 62. Bracket 62 is secured by a bolt 63 to another bracket 64 depending from ring 53. The lower end of each tube 60 is secured to a collar 65 carried by an arm 66, the latter being secured to a sleeve 67, vertically slidably mounted on a rod 68 depending from ring 53. Slidably mounted in each tube 60 is a rod 69, the upper end of which has integral spaced flanges functioning as sockets for arms 71 formed integrally in moil-grippers 72, pivoted as at 73 on tube 75. The walls of tube 75, depending from the article support 59, are slotted at 74 to permit pivotal movement of grippers 72, 72.

Figure 6:
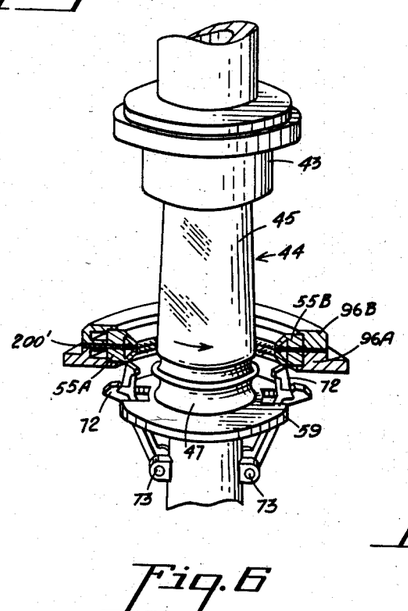
Fig. 6 is a detail perspective view, partly in vertical section, showing one of the chucks, my novel burner and the moil-gripping means, the latter being in relaxed position.
Figure 7:
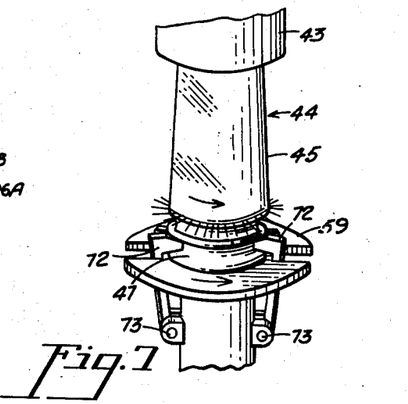
Fig. 7 is a similar perspective view showing the moil-grippers in engagement with a moil.

When each tumbler 44 is deposited on its support 59 (Fig. 6), the grippers are relaxed and the support 59 is in its elevated position. As the tumbler departs from the heating zone (Fig. 2), its physical state is such that it can be deformed. The fingers 72 are then actuated to engage and stretch the moil (Fig. 7). The engaging function is prompted by downward movement of rod 69, relative to tube 60, under the influence of compression spring 78, disposed between washer 77, secured to rod 69, and bracket 66. The relaxation of the grippers 72, on the other hand, is effected by cam 79 (Fig. 1) which elevates rod 69 in preparation for reception of a tumbler 44 on support 59.

The low surface of cam 79 permits rod 69 to be depressed before the ware reaches the stretching zone.

Figure 8:
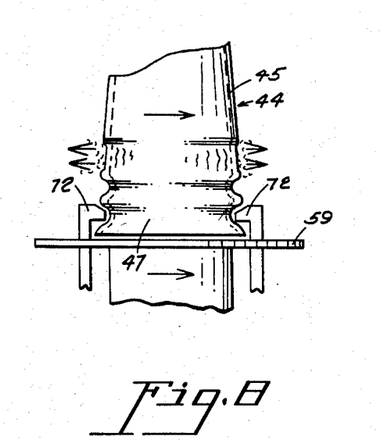
Fig. 8 is a detail side elevational view disclosing conditions which prevail during the initial stretching and severing of the heated moil from the tumbler proper.
Figure 9:
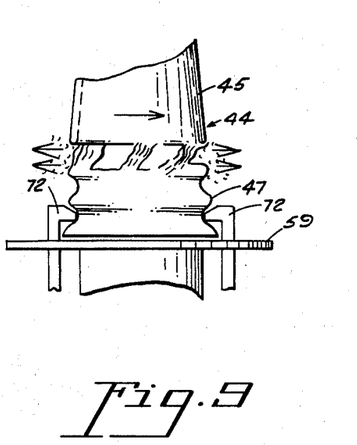
Fig. 9 is a similar view showing the final stages of separation of the moil from the tumbler.

Secured to arm 66 (Fig. 3) is a roller 89, which follows a cam 81 on the base of the machine (Figs. 1, 3) to elevate elements 67, 66, 65, 60, 59 for the acceptance of ware 44 on support 59, and to lower support 59 during the stretching operation. It will be seen that the stretching of the ware occurs during the turning of table 40 through the stretching zone segment (Fig. 2). As shown in Figs. 7, 8, the glassware is gripped by fingers 72 during the stretching operation, and stretched by the gravitational pull of elements 59, 60, 69, 75, 67, 80, 66, 65, 78 and 77, the cam surface of cam 81 (Fig. 3) then being low. The molten glass moil is severed by tension and heat from the tumbler proper. After initial gripping of the moil, the support 59 is rotated by the drag of ware 44 on it (it being understood that spindle 41 is then in rotation (Fig. 1)). However, as the moil approaches severance, the pliability of the glass becomes so great that rotation of support 59 relative to its own central axis ceases.

From the foregoing, it will be understood that each tumbler is received when its corresponding chuck 43 (left side, Fig. 1) is elevated and its corresponding support 59 (Fig. 3) is also elevated. It will also be understood that the tumbler is rotated about its own axis as it revolves (Fig. 2) about the central vertical axis (through 34, Fig. 1) of the whole machine, and that the shapes of cams 79 and 81 are such that member 69 is lowered to cause the moil to be grasped and elements 80 and 66 and associated elements to be lowered by gravity to stretch the moil at appropriate times as indicated in Fig. 2. There remains briefly to be described, before detailing the burner features of the present invention, the means for imparting rotary and translatory motion to each chuck 43. Again, this means is described in detail in my said co-pending application. Only one chuck system is herein described in detail, that one being representative of all.

Figure 3:
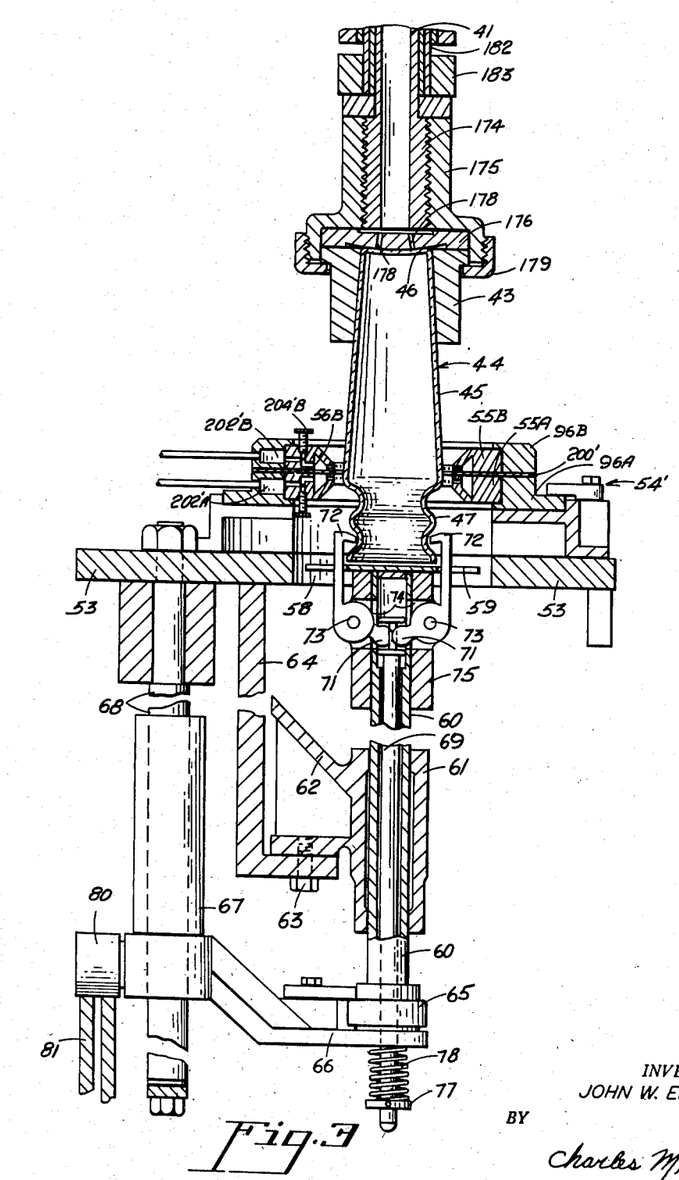
Fig. 3 is an enlarged vertical sectional view taken through a typical tumbler-supporting chuck, showing a dual burner provided in accordance with the invention and the moil-grasping and stretching means.

Reference has been made to a plurality of spindles 41 (Figs. 1 and 3) each carrying a chuck 43 (Fig. 3). The lower end of each spindle is threaded at 174 (Fig. 3) to engage an interiorly threaded chuck-holder 175, in which is positioned a plate 176, which cooperates with chuck 43 to position ware 44. Holder 175 is externally threaded to engage with an interiorly threaded lock ring 179, the latter being flanged to secure chuck 43 in place. For the purpose of elevating chuck 43 (normally gravitationally-biased downwardly as shown in my co-pending application), there is provided a sleeve 182 carrying a collar 183 (Fig. 3) so arranged that when collar 183 is elevated spindle 41 and chuck 43 are also elevated. It will also be seen hereinafter that collar 183, when elevated, causes cessation of rotation of chuck 43, but when depressed causes axial rotation of chuck 43. The elevation and depression of collar 183 is controlled by a link 184, coupled to the long arm of a bell crank lever 186. The other arm of lever 186 carries a cam roller 189, adapted to follow a cam plate 190 (Fig. 1) and elevate chuck 43 preparatory to reception of ware 44. The shape of cam 190 (Fig. 2) is such that chuck 43 is depressed to grasp the ware after its deposit on the support 59. The chuck is of course elevated to release the ware after moil severance and cooling.

Attention is invited to apertures 178 in Fig. 3, air being sucked therethrough to control the grasp of ware 44 during the heating, stretching, severing and cooling operations, and forced therethrough to release the ware preparatory to the unloading operation. The suction and pressure are properly timed and controlled by the following elements, specifically described in my said copending application: housing 118 (Fig. 1), main vacuum line 120, stationary ring 123, rotating ring 126, pressure line 191, chuck service pipe 129, the rings 126 and 123 having provisions for establishing communication between pipe 129 and pipe 120 or pipe 191 at properly timed intervals, pneumatic housing 133 supported on lug 137 carried by table 40, a valve regulated by adjusting screw 153, and a valve lifter roller 160 arrangement (Fig. 1). The valve lifter 160 is cammed upwardly at suitable times to control the creation of suction or pressure, as desired, within tube 163, spindle 41 and chuck 43. An appropriate cam mechanism is shown in my said co-pending application. Pressure is developed at chuck 43 to release ware. A vacuum is there developed to retain ware.

Housing 133 is threaded to engage a depending tube 163, on which spindle 41 is slidably telescoped. Keyed to spindle 41 is a toothed driven clutch member 164 (Fig. 1), adapted to engage a complementary driving clutch member 170, continuously driven by chain 171.

The operation of the last-described element is such that chuck 43 is axially rotated when it is depressed (right-hand, Fig. 1) and not rotated when it is elevated (left-hand, Fig. 1). It will be understood that, as elements 190, 189, and 186 lift collar 183, tube 182 and spindle 41 upwardly, the latter sliding on vertically-fixed tube 163, clutch member 164 also moves upwardly and interrupts the train or motion tending to rotate chuck 43. Conversely, when chuck 43 and spindle 41 are depressed, axial rotation is imparted to them.

A primary purpose of the above summary description of pertinent portions of a burn-off machine for which my burner is ideally suited is to make clear how each item of ware is received, then grasped by the associated chuck as the chuck is depressed—this chuck being axially rotated but vertically fixed in registry with the associated burner—then heated and clamped at the moil and stretched, then severed from the moil, cooled and finally released by the chuck and unloaded. The presentation of each tumbler to, and its motion when in the presence of, the burner being fully understood, the following description is confined to my novel burner.

Figure 10:
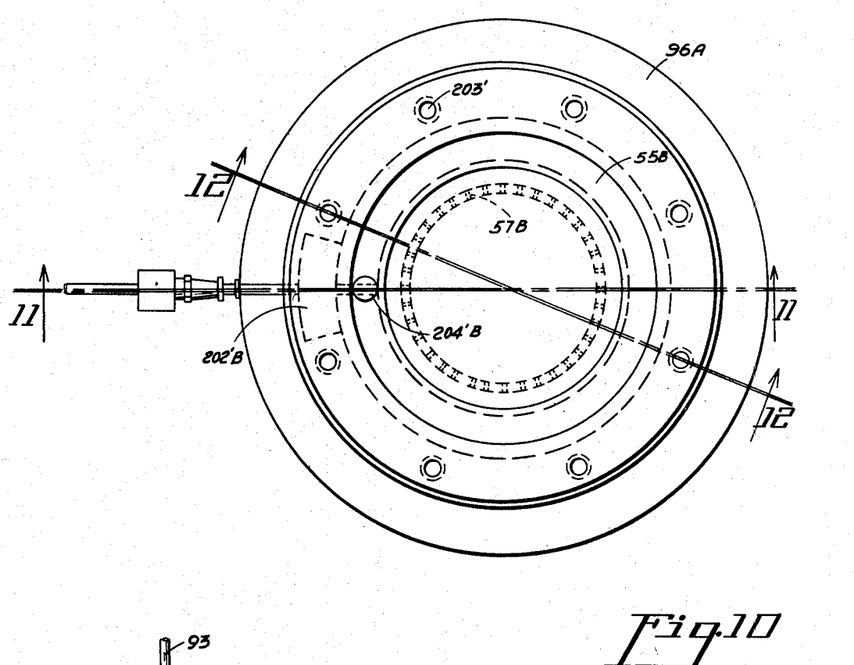
Fig. 10 is a top plan view of my novel burner per se.
Figure 11:
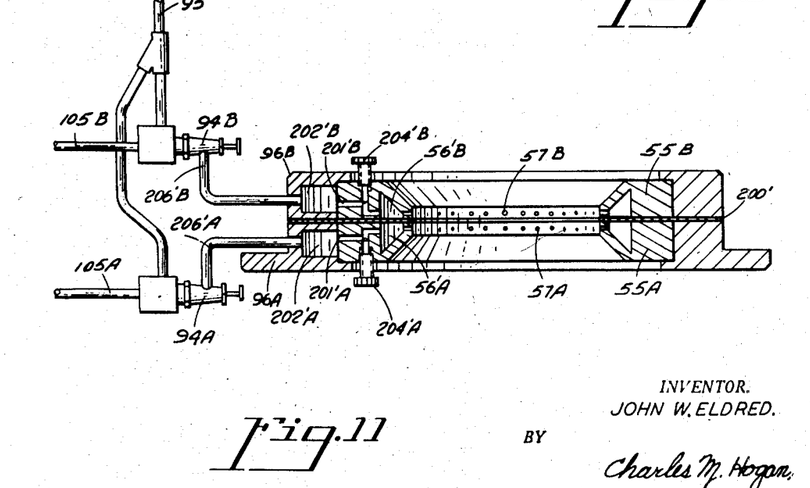
Fig. 11 is a vertical sectional view taken on line 11—11 of Fig. 10, looking in the direction of the arrows.
Figure 12:
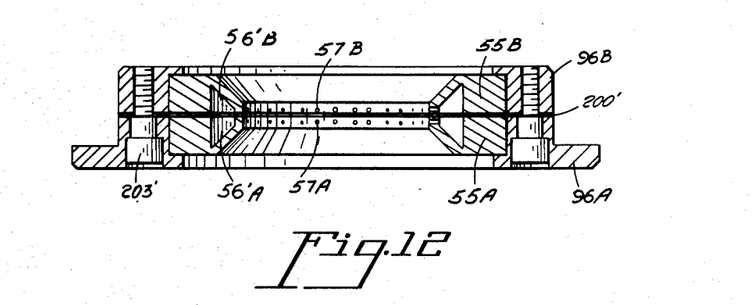
Fig. 12 is a vertical sectional view taken on line 12—12 of Fig. 10.

In accordance with the present invention, I provide a novel burner 54', shown in detail in Figs. 10, 11 and 12. A plurality of these burners are carried by ring 53, an individual burner being axially aligned with each spindle 41, as best seen in Fig. 1. Referring now specifically to Fig. 6, the open end of each article of received ware is inserted into a central opening 58 in a burner 54', of generally annular shape. The burner provides one ring-like flame for melting, softening and fire finishing the ware. This melting flame is preferably furnished by the lower burner member 55A. The burner provides a second ring-like flame for finally severing the moil from the ware. The severing flame is of a higher temperature and "sharpness" than the first. Suitable illustrative orders of temperature may be 3000° F. for the first flame and 3500°-4000° F. for the second. The two flames are separately regulated, with the following desirable results:

First, the finish is brought completely under control;

Second, the bead or lip on the ware is smaller than that formed by prior art machines and methods;

Third, the severing operation is quickly performed and "jagged edge" rejects are minimized.

The melting flame is applied to the ware exterior section, immediately above the moil, while the ware is being transported through the heating and stretching zones (Fig. 2). The ware is subjected to the severing flame while it is passing through the severing zone.

Referring again to Figs. 10, 11 and 12, each burner comprises a cap member 55B and a base member 55A, separated by an annular shim 200'. The cap and base members are of generally annular shape and cooperate with the shim to form internal circulating passages 56'A, 56'B, in communication with channels 201'A, 201'B. These channels communicate with mixing chambers 202'A, 202'B in mixer shells 96A, 96B, individually concentrically disposed about the burner members 55A, 55B.

Regulators 94A, 94B are tapped into the fuel supply line 93. Oxygen lines 105A and 105B are separately connected to the mixing chambers 202'A, 202'B, through the regulator chambers and pipes 206'A, 206'B.

The internal chambers 56B, 56A communicate with milled burner orifices or ports 57A, 57B. A plurality of such transverse ports are provided on the small-diameter faces of each of the main burner members 55A, 55B. Although for purposes of illustration I show the two sets of ports substantially separated in the vertical plane, it will be understood that in actual practice they are quite close together, the vertical separation being preferably of the order of 0.015 inch or less.

The Fig. 11 structure essentially comprises a pair of separately controlled and supplied burners, each provided with a set of transverse flame orifices, the two sets being located in close proximity to each other. The mixer shells 96A, 96B and shim 200' are suitably drilled and tapped for a plurality of bolts 203', by which the burner members are secured in assembly (Fig. 12). Suitable stop-valves 204'A, 204'B may be provided to shut off the two burner systems. Shell 96A is suitably flanged for securely mounting and bolting onto ring 53 (Fig. 3).

The fuel gas is supplied by a suitable source (not shown) to a pipe 90 (Fig. 1), terminating in a gas-tight revolving joint 91, in communication with a head chamber 92, mounted on turret 40. A plurality of gas distribution pipes 93 extend to the individual regulator pairs, such as 94A, 94B. The regulators are piped to the mixer shells 96A, 96B by lines 205'A, 206'B (Fig. 1), which convey the mixtures of oxygen and fuel to the shells. The regulators are individually manually adjusted to determine the intensity of the flames, being provided with the usual stems for that purpose.

Referring now to Fig. 2, a pilot light is mounted in a fixed position in proximity to the burners to assure the maintenance of a low-intensity flame in each burner as it approaches the heating zone.

The flow of oxygen, under pressure, to the regulator is timed in order to cause each burner member 55A to project the melting flame onto the corresponding ware as the ware passes through the heating and stretching zones, and to cause each burner member 55B to project the severing flame onto the ware as the ware passes through the severing zone. This timing is accomplished by the mechanism illustrated in Figs. 4 and 5.

Figure 4:
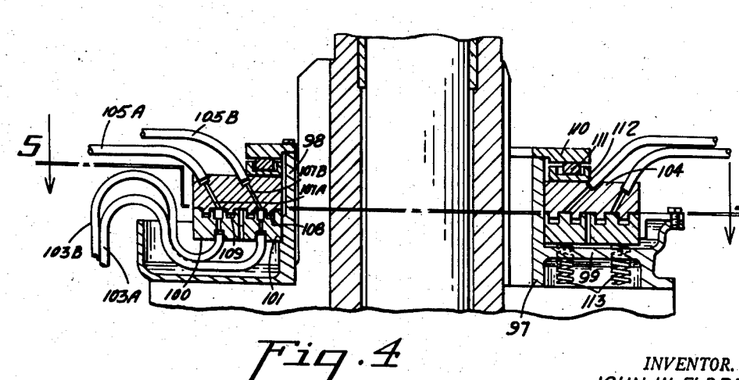
Fig. 4 is an enlarged vertical sectional view of that part of the invention which comprises the oxygen-distributing mechanism for supplying oxygen to the dual burners.
Figure 5:
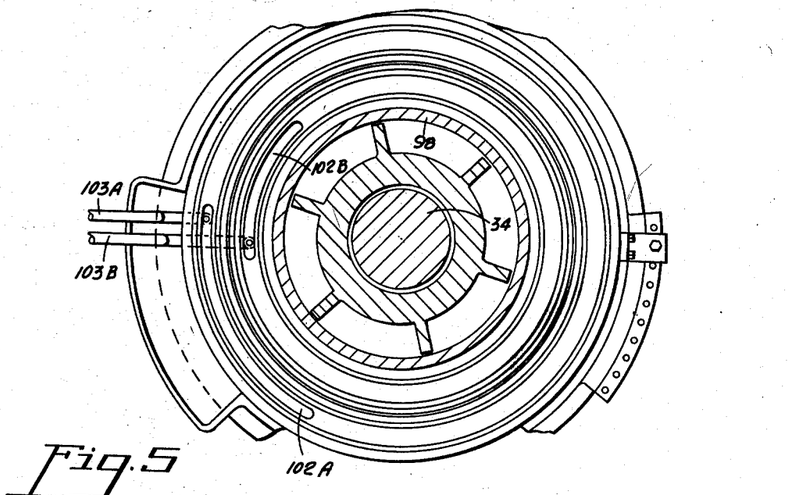
Fig. 5 is a horizontal sectional view taken on line 5—5 of Fig. 4, looking in the direction of the arrows.

There is mounted on cover 30, around hub 31, a collar 97, formed with a cylindrical vertical portion 98. Supported on the horizontal flange 99 of the collar 97 are concentric distributor rings 100 and 101, individually formed with slots 102A, 102B, which commmunicate with oxygen-supply pipes 103A, 103B, respectively, the latter leading to a source of oxygen under pressure (not shown).

Mounted on the rings 100, 101 is a rotating valve ring 104, joined for rotation with turret 40 and ring member 53 by a plurality of oxygen-conducting pipes 105A, 105B which extend from the valve ring 104 to the associated regulators 94A, 94B. These pipes communicate with channels 107A, 107B in the valve ring and these channels register with slots 102A, 102B, respectively, at the proper times. That is, oxygen passes from pipe 103A through slot 102A to pipe 105A and ultimately to each burner member 55A as that member passes through the heating and stretching zones. Similarly, oxygen passes from pipe 103B through slot 102B to pipe 105B, and ultimately to each burner member 55B as that member passes through the severing zone. The arcuate lengths of slots 102A and 102B correspond in degrees to the operating zones of burner members 55A, 55B respectively. When a burner passes through the cooling, unloading and loading zones the oxygen supply to it is cut off by high surfaces of rings 100, 101.

Valve ring 104 is formed on its under surface with concentric ribs 108 which enter complementary grooves 109 formed in the upper surfaces of the rings 100 and 101 to produce a gas-tight seal. The valve ring is held down on the distributor rings by an annulus 110 secured to portion 98 of collar 97. The annulus is formed with a depending circular rib 111, received in a complementary groove provided in a wear ring 112 disposed on top of the valve ring 104. Close-fitting engagement between the valve ring 104 and the distributor rings 100, 101 is also maintained by the provision of coil springs 113, which are mounted in sockets provided in the collar 97 and press upwardly against the under sides of the rings 100 and 101 to produce a close running fit, eliminating oxygen leakage and compensating for wear.

In accordance with one of its specific aspects the invention provides in a rotary burn-off machine of the type including a plurality of spindles and so arranged as to transport ware through successive melting and severing zones while axially rotating the ware in registry with a burner, the improvement which resides in a pair of annular separately controlled but superimposed burners, one of which is adapted to generate a melting flame and the other of which is adapted to generate a more intense severing flame, said burners having distinct inwardly directed sets of flame orifices, said sets being located in close proximity to each other.

While there has been shown what is at present considered to be the preferred embodiment of the present invention, it will be obvious to those

Having thus described my invention, I claim:

1. In a rotary burn-off machine of the type including a plurality of ware-holding spindles each of which is so arranged as to transport inverted glass ware through successive melting and severing segments while axially rotating the ware in registry with an individual one of a plurality of burner means, the improvement which resides in a plurality of burner means each comprising a pair of annular separately controlled but superimposed and abutting one-piece burners each completely encircling the ware, the lower one of which is formed with horizontally and inwardly-directed radial ports and creates a heat zone circumferentially of the ware to melt it during passage through the melting segment, and the upper one of which is formed with horizontally and inwardly-directed radial ports and intensifies said heat zone during passage of the ware through the severing segment thereby to separate the moil from the ware, the two sets of ports being in parallel planes and spaced by 0.015" or less.

2. In a rotary burn-off machine of the type including a rotary carriage and plurality of ware-holding spindles each of which is so arranged as to transport ware through successive melting and severing segments while axially rotating the ware, the improvement comprising, in combination, a first like plurality of annular burners each formed with a set of horizontally and inwardly directed radial flame orifices for creating a heat section circumferentially of a piece of ware to melt it during passage through the melting zone, a second like plurality of annular burners each formed with a set of horizontally and inwardly directed radial flame orifices for circumferentially severing the moil from the ware at the heat section during the passage through the severing zone each of the annular burners abutting another annular burner to form a dual burner with closely spaced sets of ports, a pair of fixed concentric valve plates, a complementary circular valve plate mounted for rotation adjacent said fixed plates and in synchronism with said carriage, a source of oxygen, a first plurality of oxygen feed lines connected between the complementary plate and the first set of burners, a second plurality of oxygen feed lines connected between the complementary plate and the second set of burners, means including a groove in one fixed plate having an arcuate length corresponding to the melting segment for placing in communication with said source of oxygen those of the first plurality of the feed lines which are associated with burners in said melting segment, and means including a groove in the other fixed plate having an arcuate length corresponding to said severing segment for placing in communication with said source of oxygen those of the second plurality of said feed lines which are associated with burners in said severing segment.

3. In a rotary burn-off machine of the type including a plurality of ware-holding spindles each of which is so arranged as to transport inverted glass ware through successive melting and severing segments while axially rotating the ware in registry with an individual one of a plurality of burner means, the improvement which resides in a plurality of burner means each comprising a pair of annular separately controlled but superimposed and abutting one-piece burners each completely encircling the ware, one of which is formed with horizontally and inwardly directed radial ports and creates a heat zone circumferentially of the ware to melt it during passage through the melting segment, and the other one of which is formed with horizontally and inwardly directed radial ports and intensifies said heat zone during passage of the ware through the severing segment thereby to separate the moil from the ware, the two sets of ports being in parallel planes and spaced by 0.015 inch or less.

JOHN W. ELDRED.

REFERENCES CITED

The following references are of record in the file of this patent:

UNITED STATES PATENTS

| Number | Name | Date |
|---|---|---|
| 344,987 | Redmayne | July 6, 1886 |
| 822,932 | Ennis | June 12, 1906 |
| 1,359,417 | Musser | Nov. 16, 1920 |
| 1,577,543 | Schrader | Mar. 23, 1926 |
| 1,645,991 | Higgins | Oct. 18, 1927 |
| 1,723,107 | Wildeboer | Aug. 6, 1929 |
| 2,116,129 | Stringer | May 3, 1938 |
| 2,349,822 | Gardner | May 30, 1944 |
| 2,402,452 | Schreiber | June 18, 1946 |
| 2,403,142 | Turner | July 2, 1946 |
| 2,416,121 | Schreiber et al. | Feb. 18, 1947 |
| 2,439,754 | Schutz | Apr. 13, 1948 |